(12) United States Patent
Yang et al.

(10) Patent No.: US 10,422,959 B2
(45) Date of Patent: Sep. 24, 2019

(54) METHOD FOR FABRICATING A METALLIC MICRO/NANOSTRUCTURE AT AN OPTICAL FIBER END-FACET BY THE GLUE-AND-STRIP METHOD

(71) Applicant: Tian Yang, Shanghai (CN)

(72) Inventors: Tian Yang, Shanghai (CN); Xiaolong He, Shanghai (CN); Yihe Tang, Shanghai (CN)

(73) Assignee: XU YUAN BIOTECHNOLOGY COMPANY, Shanghai (CN)

( * ) Notice: Subject to any disclaimer, the term of this patent is extended or adjusted under 35 U.S.C. 154(b) by 0 days.

(21) Appl. No.: 14/906,664

(22) PCT Filed: Jul. 22, 2014

(86) PCT No.: PCT/CN2014/082728
§ 371 (c)(1),
(2) Date: Jan. 21, 2016

(87) PCT Pub. No.: WO2015/010605
PCT Pub. Date: Jan. 29, 2015

(65) Prior Publication Data
US 2016/0161677 A1    Jun. 9, 2016

(30) Foreign Application Priority Data
Jul. 26, 2013   (CN) .......................... 2013 1 0321163

(51) Int. Cl.
*G02B 6/30*    (2006.01)
*B32B 37/00*   (2006.01)
(Continued)

(52) U.S. Cl.
CPC .............. *G02B 6/30* (2013.01); *B32B 37/025* (2013.01); *B32B 37/14* (2013.01); *G02B 6/262* (2013.01); *B32B 37/12* (2013.01); *G02B 6/29368* (2013.01)

(58) Field of Classification Search
CPC ...... G02B 6/262; G02B 6/26; G02B 6/29368; G02B 6/30; G02B 7/003; G02B 7/004;
(Continued)

(56) References Cited

U.S. PATENT DOCUMENTS 4,916,187 A * 4/1990 Goel ...................... C08G 59/18
525/109
2009/0172846 A1    7/2009 Minea et al.
(Continued)

FOREIGN PATENT DOCUMENTS

CN    I381739 A    11/2002
CN    1402260 A    3/2003
(Continued)

OTHER PUBLICATIONS

Lee, K., et. al. "Enhancing Surface Plasmon Detection Using Template-Stripped Gold Nanoslit Arrays on Plastic Films", ACS Nano, vol. 6, No. 4, Apr. 2012, pp. 2931-2938.*
(Continued)

*Primary Examiner* — Philip C Tucker
*Assistant Examiner* — Jimmy R Smith, Jr.
(74) *Attorney, Agent, or Firm* — Global IP Services; Tianhua Gu

(57) ABSTRACT

The present invention provides a method for fabricating a metallic micro/nanostructure at an optical fiber end-facet by the glue-and-strip method, wherein, firstly a metallic micro/nanostructure is fabricated on a substrate which has a relatively low binding force with it, then an optical fiber end-facet is applied with an adhesive, or a surface of the
(Continued)

metallic micro/nanostructure is applied with the adhesive, after that, the optical fiber end-facet and the metallic micro/nanostructure are glued at a predetermined angle, and finally, the adhesive is cured and the optical fiber end-facet and the metallic micro/nanostructure are stripped off the substrate to complete the fabrication. The present invention is based on the idea in the glue-and-strip method that a noble metal is stripped off a weakly bound substrate, and thus demonstrates a new method which enables fabricating a metallic micro/nanostructure at an optical fiber end-facet with high quality, and the process of which is simple, fast, and low cost.

8 Claims, 3 Drawing Sheets

(51) Int. Cl.
 *B32B 37/12* (2006.01)
 *B32B 37/14* (2006.01)
 *G02B 6/26* (2006.01)
 *G02B 6/293* (2006.01)

(58) Field of Classification Search
 CPC ....... G02B 7/005; B32B 37/025; B32B 37/12; B32B 37/14
 USPC .................................................. 156/230, 241
 See application file for complete search history.

(56) References Cited

U.S. PATENT DOCUMENTS

| | | | |
|---|---|---|---|
| 2011/0116735 A1* | 5/2011 | Baets | G01D 5/268 385/12 |
| 2013/0039616 A1* | 2/2013 | Shambat | G02B 6/30 385/14 |

FOREIGN PATENT DOCUMENTS

| | | |
|---|---|---|
| CN | 102487579 A | 6/2012 |
| CN | 102954957 A | 3/2013 |

OTHER PUBLICATIONS

Philip, K., "Optical Tooling for Precise Manufacture and Alignment", McGraw-Hill Book Company, 1962, Figs. 15-26 and 15-28.*
Newport Corporation Tutorial, "Fiber Optic Basics", 2011.*
Prashant, N. et al., "Ultrasmooth Patterned Metals for Plasmonics and Metamaterials", Science, No. 594, vol. 325, Jul. 31, 2009 (31.Q7 .2009), pp. 595-597.

* cited by examiner

METHOD FOR FABRICATING A METALLIC MICRO/NANOSTRUCTURE AT AN OPTICAL FIBER END-FACET BY THE GLUE-AND-STRIP METHOD

CROSS REFERENCE TO RELATED PATENT APPLICATION

The present application is the US national stage of PCT/CN2014/082728 filed on Jul. 22, 2014, which claims the priority of the Chinese patent applications No. 201310321163.5 filed on Jul. 26, 2013, which application is incorporated herein by reference.

BACKGROUND OF THE PRESENT INVENTION

Field of Invention

The present invention belongs to a field of micro/nano fabrication, and particularly relates to a method for fabricating a metallic micro/nanostructure at an optical fiber end-facet by the glue-and-strip method.

Description of Related Arts

By integrating micro/nano devices at the end-facets of optical fibers, exciting and detecting the micro/nano devices by light-waves using optical fiber guided wave technologies, optical functional devices that are simple, flexible and portable can be obtained; meanwhile, since the optical fiber is very fine, such devices can be inserted into very small spaces or in vivo environments. However, using current mainstream micro/nano patterning technologies, such as UV photolithography, electron-beam lithography, focused ion beam etching, etc., it is difficult to fabricate micro/nano patterns and devices on the optical fiber end-facets straightforwardly and efficiently. The reason is that, if UV photolithography or electron-beam lithography is used to fabricate a micro/nano pattern on the optical fiber end-facet, uniform and controlled application of photoresist onto the sample is required. In order to achieve a high fabrication accuracy, the whole optical fiber end-facet needs to have a very uniform photoresist in thickness. However the optical fiber end-facet has a very small size (e.g., the optical fiber used for optical fiber communication generally has a cladding diameter merely about 125 microns), on which the photoresist can't be applied by using a conventional spin coating method in semiconductor industry. A technology in which the optical fiber end-facet is dipped with a drop of photoresist, then the drop of photoresist is blown to be flat by using an air gun, was proposed. But such method is very inaccurate in the control of the thickness of the photoresist, and the fabrication of micro/nano patterns at the optical fiber end-facet by using such a method has a very low yield (Shengfei Feng, Xinping Zhang, Hao Wang, Mudi Xin, and Zhenzhen Lu, "Fiber coupled waveguide grating structures," Appl. Phys. Lett. 96, 133101 (2010)). If focused ion beam etching method is used to fabricate a micro/nano pattern on the optical fiber end-facet, although the required patterns can be obtained, the fabrication time of focused ion beam etching is very long, and the fabrication cost is very high; moreover, re-calibration of the focusing parameters of the focused ion beam etching instrument is required prior to the end-facet fabrication of each new optical fiber (A. Dhawan, J. F. Muth, D. N. Leonard, M. D. Gerhold, J. Gleeson, T. Vo-Dinh, and P. E. Russell, "Focused ion beam fabrication of metallic nanostructures on end faces of optical fibers for chemical sensing applications," J. Vac. Sci. Technol. B 26, 2168 (2008)).

The present invention is to firstly fabricate a metallic micro/nanostructure on another substrate, and then glue and strip the structure to the optical fiber end-facet to fabricate the metallic micro/nanostructure on the optical fiber end-facet. A similar glue-and-strip method ("template stripping") has been used to fabricate metallic micro/nanostructures with high surface quality on planar substrates with relatively large areas (P. Nagpal, N. C. lindquist, S. H. Oh and D. J. Norris, "Ultrasmooth Patterned Metals for Plasmonics and Metamaterials," Science 325, 594 (2009)), while the above reported method requires a target substrate with a strong adhesion force to a metal, which is not suitable for fabricating a metallic micro/nanostructure at the optical fiber end-facet. It has become a very attractive subject to fabricate a metallic micro/nanostructure at an optical fiber end-facet, and there are various attempts in literatures, but using the glue-and-strip method to achieve it has not been reported. Hereinafter the glue-and-strip method is described, where its main principle is to take advantage of the weak surface binding force between a noble metal and a substrate of a solid material (e.g., glass, mica, silicon, etc). Firstly, the substrate having a weak surface binding force with a metal is etched with a micro/nano pattern, then, a metal is deposited on the substrate having the micro/nano pattern thereon, after that, the metal layer is stripped and transferred to another planar substrate with the metal surface which was originally bound with the substrate facing upward, to complete the fabrication of the metallic micro/nanostructure on the substrate. When using the substrates, such as mica and silicon, that have extremely high surface smoothness, the metallic micro/nanostructures fabricated by the glue-and-strip method also have a very smooth surface. The existing glue-and-strip method is a large area glue-and-strip, i.e., the whole metallic micro/nanostructure on the substrate is stripped and transferred to another substrate.

Besides, due to the limit of slicing accuracy of the optical fiber, prior to fabrication, the end-facet of the optical fiber itself is not completely perpendicular to the optical fiber, such as being 90±1 degrees, that is, a certain angular offset exists. As a result, the conventional methods for fabricating a micro/nano structure at an optical fiber end-facet are difficult to achieve the precise perpendicularity between the plane of the micro/nano structure and the optical fiber, which may affect the final optical performance of the optical fiber end-facet integrated device to some extent.

In view of the above disadvantages in the prior art, the present invention is based on the idea in the glue-and-strip method that a noble metal is stripped off a weakly bound substrate, and thus demonstrates a new method which enables fabricating a metallic micro/nanostructure at an optical fiber end-facet with high quality, and the process of which is simple, fast, and low cost. Moreover, by a process that sets a predetermined angle of 90° between the optical fiber and the substrate, the present invention can adjust the angle between the plane of the micro/nano structure on the optical fiber end-facet and the optical fiber to a precise 90° after the completion of the fabrication.

SUMMARY OF THE PRESENT INVENTION

In view of the disadvantages in the prior art, the object of the present invention is to provide a method for fabricating a metallic micro/nanostructure at an optical fiber end-facet by the glue-and-strip method, so as to achieve a method which enables fabricating the metallic micro/nanostructure at the optical fiber end-facet with high quality, and which adjusts the angle between the plane of the micro/nano structure on the optical fiber end-facet and the optical fiber to a precise 90° after the completion of the fabrication, and the process of which is simple, fast and low cost.

In order to achieve the above object and other related objects, the present invention provides a method for fabricating a metallic micro/nanostructure at an optical fiber end-facet by the glue-and-strip method, which at least comprises the following steps: 1) providing a substrate and an optical fiber, and fabricating a metallic micro/nanostructure on a surface of the substrate; 2) applying an adhesive to an optical fiber end-facet or a surface of the metallic micro/nanostructure; 3) setting the optical fiber and the substrate with a predetermined angle, and gluing the optical fiber end-facet and the metallic micro/nanostructure with the adhesive; 4) curing the adhesive, and stripping the optical fiber end-facet and the metallic micro/nanostructure off the substrate, to complete the fabrication.

The method for fabricating a metallic micro/nanostructure at an optical fiber end-facet by the glue-and-strip method is characterized in that: the metallic micro/nanostructure has low binding force characteristic with respect to the surface of the substrate.

As a preferable embodiment of the method for fabricating a metallic micro/nanostructure at an optical fiber end-facet by the glue-and-strip method, the substrate is a silicon substrate, and the metallic micro/nanostructure is a gold micro/nanostructure.

As for the above solution, furthermore, the metallic micro/nanostructure is a gold nanoslit array structure.

As a preferable embodiment of the method for fabricating a metallic micro/nanostructure at an optical fiber end-facet by the glue-and-strip method, the predetermined angle in step 3) is 90°.

As a preferable embodiment of the method for fabricating a metallic micro/nanostructure at an optical fiber end-facet by the glue-and-strip method, the method for achieving the predetermined angle of 90° between the optical fiber and the substrate is that the optical fiber is aligned with a mirror image of the optical fiber in the substrate into a straight line.

As a preferable embodiment of the method for fabricating a metallic micro/nanostructure at an optical fiber end-facet by the glue-and-strip method, after the fabrication, the angle between the plane of the metallic micro/nanostructure and the optical fiber is equal to the predetermined angle of 90°, rather than the angle between the end-facet of the optical fiber itself and the optical fiber before the fabrication.

As a preferable embodiment of the method for fabricating a metallic micro/nanostructure at an optical fiber end-facet by the glue-and-strip method, the adhesive is an epoxy resin, with a curing temperature of 120~240° C., and a curing time of 1~10 min.

As a preferable embodiment of the method for fabricating a metallic micro/nanostructure at an optical fiber end-facet by the glue-and-strip method, the front of the optical fiber is a bare optical fiber.

As a preferable embodiment of the method for fabricating a metallic micro/nanostructure at an optical fiber end-facet by the glue-and-strip method, the front of the optical fiber is an optical fiber with a length less than 0.1 mm from the end-facet of the optical fiber.

As a preferable embodiment of the method for fabricating a metallic micro/nanostructure at an optical fiber end-facet by the glue-and-strip method, the bare optical fiber is a single-mode bare optical fiber with a core diameter no greater than 15 microns.

From the above, the method for fabricating a metallic micro/nanostructure at an optical fiber end-facet by the glue-and-strip method has the following beneficial effects: a metallic micro/nanostructure is fabricated on a substrate which has a relatively low binding force with it, an optical fiber end-facet is applied with an adhesive, or a surface of the metallic micro/nanostructure is applied with the adhesive, the optical fiber end-facet and the metallic micro/nanostructure are glued at a predetermined angle, and finally, the adhesive is cured and the optical fiber end-facet and the metallic micro/nanostructure are stripped to complete the fabrication. The method described in the present invention avoids the complication of the fabrication process and the increase in cost caused by directly performing micro/nano fabrication on the optical fiber end-facet. Large-scale and automatic fabrication of micro/nano structures on silicon wafers is already a mature, efficient, and high quality technique, on this basis, the method shown in the present invention merely requires simple and fast glue-and-strip, which is suitable for low-cost and high efficiency production. The present invention also has the following advantages: applying adhesive to the optical fiber end-facet can remedy the original defects on the optical fiber end-facet, the angle between the after-applying-adhesive optical fiber end-facet and the optical fiber can be adjusted to 90° by the process of aligning the optical fiber with its mirror image under a stereomicroscope, the stripping method provides a very smooth gold surface which can improve the quality of the micro/nano gold device itself. All in all, in the present invention, the shown method for fabricating a metallic micro/nanostructure at an optical fiber end-facet has the advantages of low cost, high quality, and simple and fast in fabrication.

Figure 1:
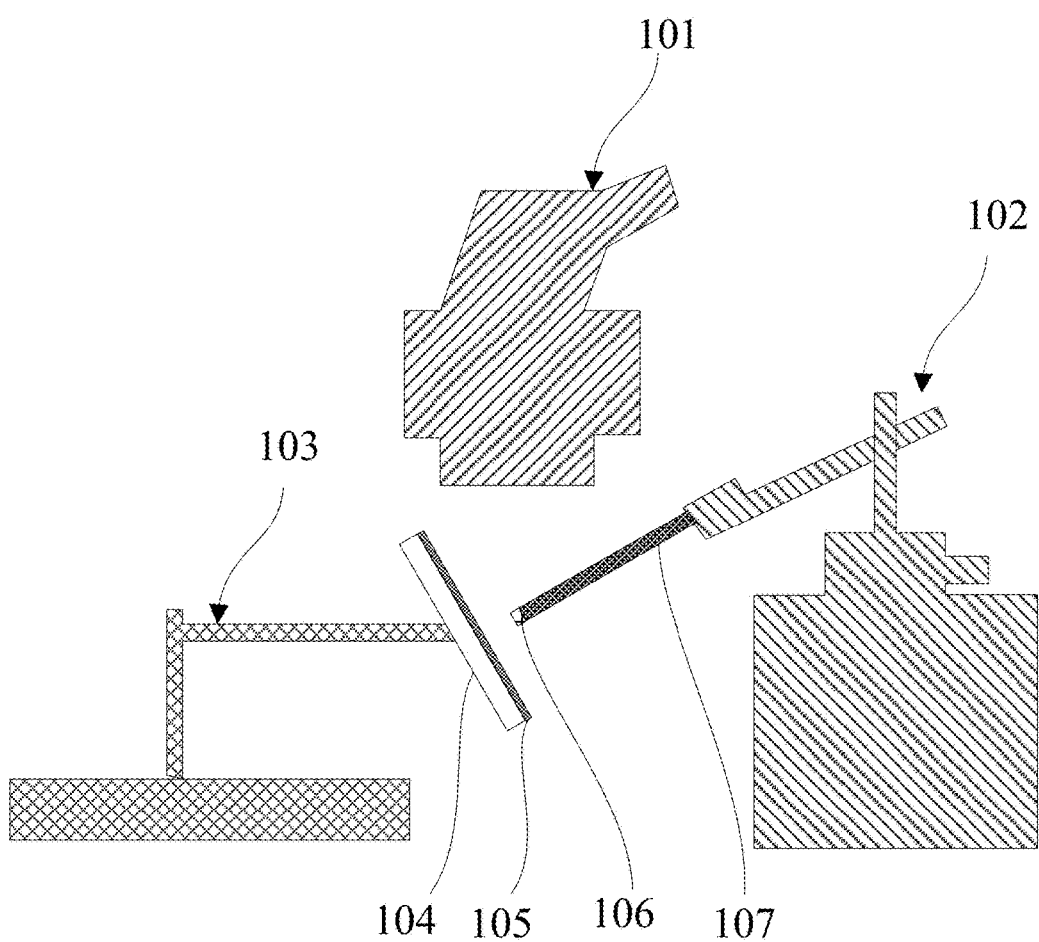
FIG. 1 shows an implementation process diagram of a method for fabricating a metallic micro/nanostructure at an optical fiber end-facet by the glue-and-strip method.

DESCRIPTION OF REFERENCE NUMERALS 101 stereomicroscope
102 five-dimensional translation stage
103 clamp
104 silicon substrate
105 gold micro/nano structure
106 adhesive
107 optical fiber
S1~S4 steps 1)~4)

DETAILED DESCRIPTION OF THE PREFERRED EMBODIMENTS

Embodiments of the present invention are described by the following specific examples. Those skilled in the art can easily understand other advantages and effects of the present invention from the content disclosed by the description. The present invention may also be implemented or applied through other different specific embodiments. Details in the description may be modified or altered on basis of different opinions and application without departing from the spirit of the description.

Please refer to FIG. 1 to FIG. 4. It should be noted that, figures provided by the embodiments only illustratively present the basic ideas of the present invention, so the figures only show components related to the present invention without in accordance with the number, shape and size of components for actual implementation. The shape, number and scale of each component may be changed according to requirement during actual implementation, thus layout of the components may be more complicated.

Figure 2:
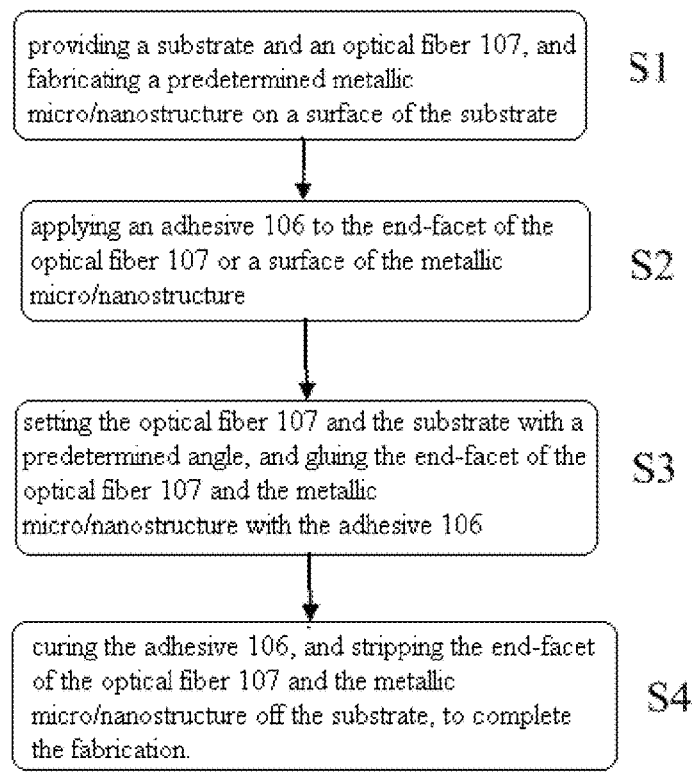
FIG. 2 shows an implementation flow diagram of a method for fabricating a metallic micro/nanostructure at an optical fiber end-facet by the glue-and-strip method.

The present embodiment provides a method for fabricating a metallic micro/nanostructure at an end-facet of an optical fiber 107 by the glue-and-strip method, which at least comprises the following steps:

As shown in FIGS. 1 to 2, firstly performing step 1) S1, providing a substrate and an optical fiber 107, and fabricating a predetermined metallic micro/nanostructure on a surface of the substrate; then performing step 2) S2, applying an adhesive 106 to the end-facet of the optical fiber 107 or a surface of the metallic micro/nanostructure; then performing step 3) S3, setting the optical fiber 107 and the substrate with a predetermined angle, and gluing the end-facet of the optical fiber 107 and the metallic micro/nanostructure with the adhesive 106; finally performing step 4) S4, curing the adhesive 106, and stripping the end-facet of the optical fiber 107 and the metallic micro/nanostructure off the substrate, to complete the fabrication.

As an example, the front of the optical fiber is a bare optical fiber. Specifically, the front of the optical fiber is an optical fiber with a length less than 0.1 mm from the end-facet of the optical fiber. In the present embodiment, the bare optical fiber is a single-mode bare optical fiber with a core diameter no greater than 15 microns.

The metallic micro/nanostructure has low binding force characteristic with respect to the surface of the substrate. Such characteristic helps to strip the metallic micro/nanostructure off the substrate, so as to ensure the integrity of the metallic micro/nanostructure, and to improve the yield of fabrication. In the present embodiment, the substrate is a silicon substrate 104, and the metallic micro/nanostructure is a gold micro/nanostructure 105. In a specific implementation process, the metallic micro/nanostructure is a gold nanoslit array structure. In step 3), the predetermined angle is 90°. The adhesive 106 is an epoxy resin, with a curing temperature of 120~240° C., and a curing time of 1~10 min. Preferably, the curing temperature is 180° C., and the curing time is 5 min.

In the specific implementation process, firstly, by using a conventional micro/nano fabrication technology, a gold micro/nano structure 105 is fabricated on the silicon wafer; then, the end-facet of the optical fiber 107 is applied with the adhesive 106, and the end-facet of the optical fiber 107 applied with the adhesive 106 is glued with the gold micro/nano structure 105 on the silicon substrate 104; after that, the gold micro/nano structure 105 is stripped off the silicon substrate 104, thereby the gold micro/nano structure 105 is transferred to the end-facet of the optical fiber 107. In practical use, other metals and substrates having weak surface binding force with the selected metal may be alternatively used.

The specific flow is as below: firstly, depositing a gold film with a thickness of 15~50 nm on the silicon substrate 104 by electron beam evaporation; then spin-coating a Poly(methyl methacrylate) (PMMA) thin film resist with a thickness of 50~200 nm on the gold thin film; after that, fabricating a micro/nano pattern on the PMMA thin film by using electron-beam lithography, and transferring the micro/nano pattern to the gold thin film by using argon ion-beam milling to fabricate the gold micro/nano structure 105; finally, rinsing and removing the PMMA thin film by acetone.

Afterwards, the silicon substrate 104 on which the gold micro/nano structure 105 is fabricated is fixed by the clamp 103 at an observation point under the stereomicroscope 101 at an angle to the horizontal plane (the surface with the gold micro/nano structure is upward), and herein the adopted angle is 60°. The end-facet of the optical fiber 107 is dipped with a drop of the adhesive 106. Then, the optical fiber 107 is fixed by the clamp 103, and assembled on a five-dimensional translation stage 102 which includes x, y, z, a pitch angle and a horizontal rotational angle, and the end-facet of the optical fiber is moved close to the surface of the silicon substrate 104 by using the five-dimensional translation stage 102, as shown in FIG. 1. By observing the optical fiber 107 and its mirror image in the silicon substrate 104 using the stereomicroscope, the rotational angle of the optical fiber 107 is adjusted to align the optical fiber 107 and its mirror image into a straight line, so as to ensure that the optical fiber 107 is perpendicular to the surface of the silicon substrate 104. The end-facet of the optical fiber 107 is moved to align with the gold micro/nano structure 105, and the optical fiber 107 is moved to slowly approach the gold micro/nano structure 105 at an angle perpendicular to the surface of the silicon substrate 104 until observing that the adhesive 106 is in contact with the gold micro/nano structure 105, then the movement of the optical fiber 107 is stopped.

Finally, the adhesive 106 is cured according to its curing condition, e.g., if using a thermo-curing adhesive 106, the silicon substrate 104 is heated to cure the adhesive; if using an UV curing adhesive, the adhesive is cured by irradiation of an UV lamp, etc. During the present implementation process, the adhesive 106 is an epoxy resin (EPO-TEK 330 produced by Epoxy Technology Inc.), and the manner for curing is thermal curing, specifically, the epoxy resin is heated to 120~240° C., and heated for 1~10 min, in the present embodiment, the heating temperature is 180° C., and the heating time is 5 min. After the adhesive is cured, the optical fiber 107 is moved off the surface of the silicon substrate 104, to complete the transfer of the gold micro/nano structure 105 from the silicon substrate 104 to the end-facet of the optical fiber 107, to complete the fabrication.

Figure 3:
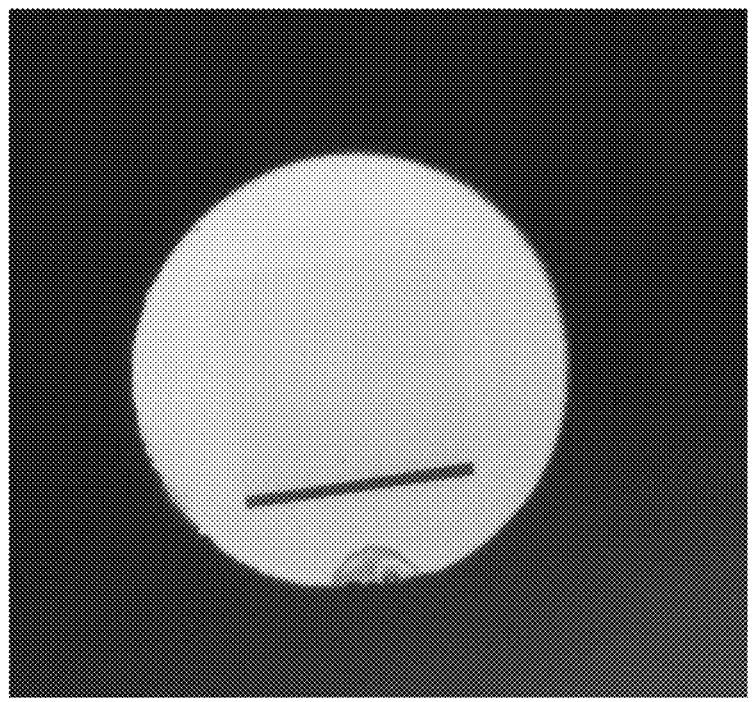
FIG. 3 shows a picture of a gold nanoslit array fabricated at an optical fiber end-facet under an optical microscope by using a method for fabricating a metallic micro/nanostructure at an optical fiber end-facet by the glue-and-strip method.
Figure 4:
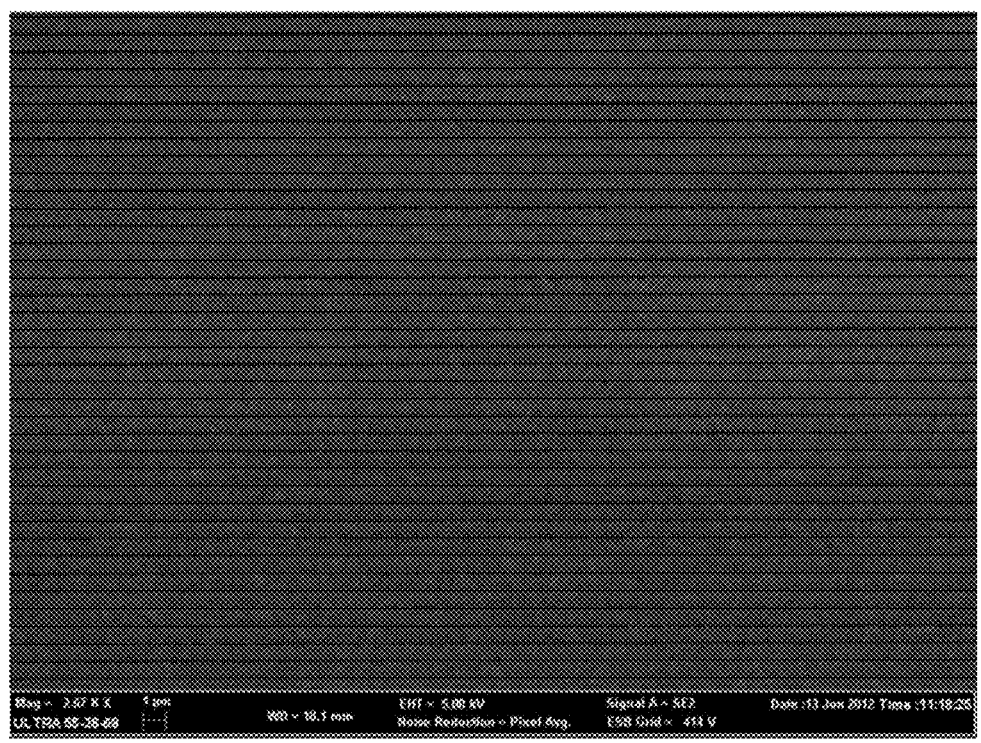
FIG. 4 shows a picture of a gold nanoslit array fabricated at an optical fiber end-facet under an electron microscope by using a method for fabricating a metallic micro/nanostructure at an optical fiber end-facet by the glue-and-strip method.

As shown in FIGS. 3 to 4, the method described in the present invention can transfer the gold micro/nano structure 105 fabricated on the silicon wafer to the end-facet of the optical fiber 107 with a high quality. In the specific implementation process, the present invention successfully transfer the gold nanoslit array structure with a period of 800 nm and a width of 50 nm on the silicon wafer to the end-facet of the optical fiber 107.

In summary of the above, the method for fabricating a metallic micro/nanostructure at an optical fiber end-facet by the glue-and-strip method is comprised of the steps: firstly a metallic micro/nanostructure is fabricated on a substrate which has a relatively low binding force with it, then an optical fiber end-facet is applied with an adhesive, or a surface of the metallic micro/nanostructure is applied with the adhesive, after that, the optical fiber end-facet and the metallic micro/nanostructure are glued at a predetermined angle, and finally, the adhesive is cured and the optical fiber end-facet and the metallic micro/nanostructure are stripped to complete the fabrication. The method described in the present invention avoids the complication of the fabrication process and the increase in cost caused by directly performing micro/nano fabrication on the optical fiber end-facet. Large-scale and automatic fabrication of micro/nano structures on silicon wafers is already a mature, efficient, and high quality technique, on this basis, the method shown in the present invention merely requires simple and fast glue-and-strip, which is suitable for low-cost and high efficiency production. The present invention also has the following advantages: applying adhesive to the optical fiber end-facet can remedy the original defects on the optical fiber end-facet, the angle between the after-applying-adhesive optical fiber end-facet and the optical fiber can be adjusted to 90° by the process of aligning the optical fiber with its mirror image under a stereomicroscope, the stripping method provides a very smooth gold surface which can improve the quality of the micro/nano gold device itself. All in all, in the present invention, the shown method for fabricating a metallic micro/nanostructure at an optical fiber end-facet has the advantages of low cost, high quality, and simple and fast in fabrication. Therefore, the present invention effectively overcomes a variety of disadvantages in the prior art and has high industrial utility value.

The abovementioned embodiments only illustratively describe the principle and efficacy of the present invention, rather than being used to limit the present invention. Any person skilled in the art may modify or amend the abovementioned embodiments without departing from the spirit and scope of the present invention. Thus, all equivalent modifications or amendments accomplished by persons having common knowledge in the technical field concerned without departing from the spirit and technical thoughts revealed by the present invention shall still be covered by the claims of the present invention.

What is claimed is:

1. A method for fabricating a metallic micro/nanostructure at an optical fiber end-facet by a glue-and-strip method, characterized in that, the method at least comprises the following steps:

step 1: providing a substrate composed of a silicon wafer and providing an optical fiber, and fabricating a metallic micro/nanostructure on a surface of the silicon wafer;

step 2: applying an adhesive to an end-facet of the optical fiber or a surface of the metallic micro/nanostructure;

step 3: setting the optical fiber and the substrate with a predetermined angle, and gluing the optical fiber end-facet and the metallic micro/nanostructure with the adhesive;

step 4: curing the adhesive, and stripping off the metallic micro/nanostructure, which is glued on the end-facet of the optical fiber, from the substrate to complete the fabrication.

2. The method for fabricating a metallic micro/nanostructure at an optical fiber end-facet by the glue-and-strip method according to claim 1, wherein the metallic micro/nanostructure is made of gold.

3. The method for fabricating a metallic micro/nanostructure at an optical fiber end-facet by the glue-and-strip method according to claim 1, wherein the metallic micro/nanostructure is a gold nanoslit array structure.

4. The method for fabricating a metallic micro/nanostructure at an optical fiber end-facet by the glue-and-strip method according to claim 1, wherein the predetermined angle in the step 3 is 90°.

5. The method for fabricating a metallic micro/nanostructure at an optical fiber end-facet by the glue-and-strip method according to claim 4, wherein after the fabrication, the angle between a top surface of the metallic micro/nanostructure and a long axis of the optical fiber is equal to the predetermined angle of 90°.

6. The method for fabricating a metallic micro/nanostructure at an optical fiber end-facet by the glue-and-strip method according to claim 1, wherein the adhesive is an epoxy resin, with a curing temperature of 120~240° C., and a curing time of 1~10 min.

7. The method for fabricating a metallic micro/nanostructure at an optical fiber end-facet by the glue-and-strip method according to claim 1, wherein the end of the optical fiber having the metallic micro/nanostructure is a bare optical fiber.

8. The method for fabricating a metallic micro/nanostructure at an optical fiber end-facet by the glue-and-strip method according to claim 7, wherein the bare optical fiber is a single-mode bare optical fiber with a core diameter no greater than 15 microns.

* * * * *